Figure 1:
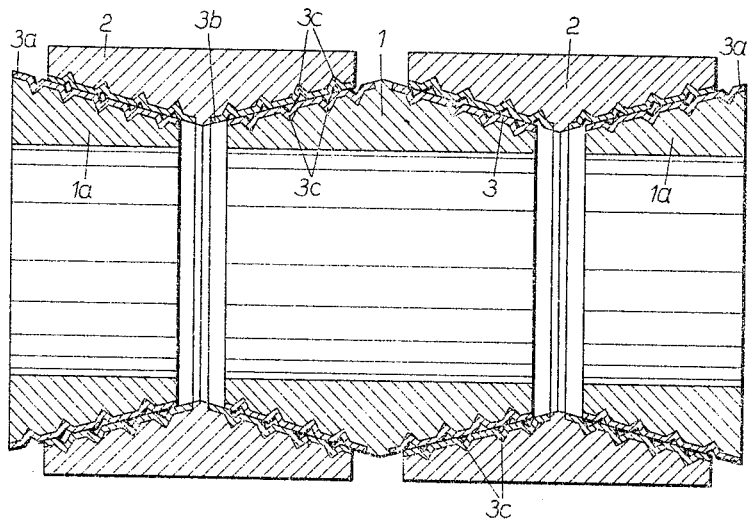

Feb. 1, 1966   O. E. PETER ETAL   3,232,598
ANNULAR SPRING OF LIGHT METAL
Filed May 15, 1963

Inventor
OSKAR E. PETER
AND LOTHAR PETER
By Bailey, Stephens & Huettig
Attorneys United States Patent Office 3,232,598
Patented Feb. 1, 1966

3,232,598
ANNULAR SPRING OF LIGHT METAL
Oskar E. Peter, Stuttgarter Strasse 34, Brackenheim, Germany, and Lothar Peter, Seestrasse 31, Guglingen, Germany
Filed May 15, 1963, Ser. No. 280,571
2 Claims. (Cl. 267—9)

The present invention relates to an annular spring of light metal which is composed of closed inner and outer rings with conical contact surfaces.

Although annular springs are already known and have been extensively used for about 40 years and it has even been proposed to make such springs of light metal, it has so far not been possible to produce annular springs of light metal which could really be used in acutal practice, even though such springs of light metal would be very desirable because of several very advantageous properties of the material. The reason for the past failures is that after being finished, the conical contact surfaces of the inner and outer rings of light metal are covered with a hard coating of oxide, a so-called corundum coating. When springing back and forth, the inner and outer rings of an annular spring of light metal are moved back and forth in the axial direction under a considerable radial pressure and generation of a high temperature. If the contact surfaces of the light-metal rings sliding along each other are coated with a layer of corundum, metal particles are then easily torn out of these surfaces so that they are seriously damaged and cold welding will occur extensively.

It is an object of the present invention to provide an annular spring of light metal which is really useful and efficient in actual practice. For attaining this object, the invention provides the contact surfaces of the inner and outer rings of light metal which engage with each other to be covered with layers of a different metal of a high solidity, preferably high-strength steel so that the dangerous hard corundum coating of the light-metal rings will no longer be effective and the conical contact surfaces of the rings will not be damaged when in use. In this manner it is now possible to utilize the advantageous properties of light metal also for annular springs. These advantages consist, for example, of the smaller coefficient of elasticity of 700,000 kg./cm.$^2$ as compared with that of steel of 2,100,000 kg./cm.$^2$, so that annular springs of light metal have an elasticity three times as great as that of annular springs of steel which have the same dimensions and the same strength factors and are subjected to the same stresses. The annular springs according to the invention also have the better heat conductivity of the light metal, as the result of which the considerable temperature which occurs during the operation is very quickly dissipated so that the springs may be utilized to their full extent for a much greater length of time than similar springs of steel. Also, the lubricating film between the contact surfaces of the rings will remain effective for a longer time because of the better heat conduction of the light metal.

Another important feature of the invention resides in the fact that the hard-metal layers on the light-metal rings may when worn be easily replaced by new layers. The layers themselves are simple stamped pieces and may therefore be produced at a low cost. The valuable inner and outer rings of light metal, however, remain unaffected and unchanged.

According to another feature of the invention, the hard-metal layers are preferably pressed by means of conical projections into the rings and are thereby positively and securely connected thereto. This results in the further advantage that the cavities which are produced by pressing the conical projections into the rings will also serve as lubricating chambers, whereby the length of service and reliability of operation of the annular spring will be considerably increased. This connection by means of impressed projections has the further advantage that the axial shearing forces which occur during the operation will be properly taken up by the light-metal rings and will not cause the layers to be severed therefrom.

The hard-metal covers preferably consist of several parts. This has the advantage that the inner and outer rings of light metal when subjected to axial stresses will be uniformly compressed or will uniformly expand in the radial directions.

If advisable in view of the particular application and purpose of the annular spring, the covering layers on the light-metal rings may—instead of consisting of a highly resistant steel—also consist of a copper-beryllium alloy.

The various features and advantages of the present invention will become more clearly apparent from the following description of one embodiment of the invention which is illustrated in the accompanying drawings, in which—

Figure 2:
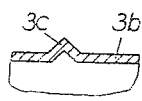

FIGURE 1 shows an axial section of an annular spring of light metal according to the invention, while FIGURE 2 shows a partial view of a covering layer for one of the rings of the annular spring with a pressed-out conical projection thereon.

The annular spring according to the invention, as illustrated in FIG. 1, consists of a closed inner ring 1 with conical outer surfaces at both sides thereof, a pair of closed inner end rings 1a each with a conical outer surface at one side thereof, and a pair of closed outer rings 2 with corresponding inner conical surfaces at both sides thereof. All of these rings consist of a very solid light-metal alloy. The conical surfaces of the inner and outer rings 1, 1a, and 2 are provided with layers 3, 3a, and 3b, respectively, which consist of steel bands of a highly resistant steel. The layers 3, 3a, and 3b are provided with conical projections 3c which are pressed out of the layers and pressed into the conical surfaces of the light-metal rings of the annular spring so that these layers are thus positively and securely connected to the light-metal rings.

The hard-metal layers may, however, also be connected to the light-metal rings by other suitable means either in place of or in addition to the conical projections 3c, for example, by being cemented or screwed to the rings.

Although our invention has been illustrated and described with reference to the preferred embodiment thereof, we wish to have it understood that it is in no way limited to the details of such embodiment, but is capable of numerous modifications within the scope of the appended claims.

Having thus fully disclosed our invention, what we claim is:

1. An annular spring comprising closed inner and outer rings consisting of light metal and having conical contact surfaces, and layers of a different highly resistant metal covering said contact surfaces and engaging with each other and having conical projections pressed into said rings so as to connect said layers positively to said rings.

2. An annular spring comprising closed inner and outer rings consisting of light metal and each having first and second conical contact surfaces, and layers of a different highly resistant metal covering each of said contact surfaces and engaging with each other, the layers on the first contact surface of each ring being separate from the layers on the second contact surface of such ring.

References Cited by the Examiner

UNITED STATES PATENTS

| | | | |
|---|---|---|---|
| 2,669,447 | 2/1954 | O'Connor | 267—1 |
| 2,948,526 | 8/1960 | Maier | 267—1 |
| 3,073,585 | 1/1963 | Hanle | 267—9 |

FOREIGN PATENTS 553,606   5/1943   Great Britain.

OTHER REFERENCES

Spring Design and Application: Chironis, N. P., New York, McGraw-Hill Book Company, Inc., 1961, TJ210 P7 C.2 (pages 196–199 relied on).

ARTHUR L. LA POINT, *Primary Examiner.*